United States Patent [19]

Ross

[11] 3,805,497

[45] Apr. 23, 1974

[54] VEHICLE PROTECTIVE SYSTEM

[75] Inventor: Gerald F. Ross, Lexington, Mass.

[73] Assignee: Sperry Rand Corporation, Great Neck, N.Y.

[22] Filed: May 14, 1971

[21] Appl. No.: 143,381

[52] U.S. Cl............................. 56/10.4, 56/DIG. 15
[51] Int. Cl........................................... A01d 75/18
[58] Field of Search............ 56/10.2, 10.4, DIG. 15, 56/208, 210; 172/6; 47/1.43; 340/258 R, 258 B, 258 C

[56] References Cited
UNITED STATES PATENTS

| 3,546,467 | 12/1970 | Benjamin et al. | 340/258 B |
| 3,524,180 | 8/1970 | Cruse | 340/258 B |
| 3,088,111 | 4/1963 | Davies | 340/258 B |
| 3,644,917 | 2/1972 | Perlman | 340/258 B |
| 3,543,860 | 12/1970 | Field | 172/6 |
| 3,609,913 | 10/1971 | Rose | 47/1.43 |
| 2,751,030 | 6/1956 | Null | 56/DIG. 15 |
| 3,597,907 | 8/1971 | Neal | 56/208 |
| 3,368,214 | 2/1968 | Swanson | 56/DIG. 15 |

Primary Examiner—Antonio F. Guida
Attorney, Agent, or Firm—Howard P. Terry

[57] ABSTRACT

An electromagnetic obstacle detection system for the protection of farm and other vehicles or machinery from hidden rocks or other foreign bodies employs pulse base-band electromagnetic radiations with symmetrically placed receivers feeding a threshold detector in a balanced network. The presence of a dangerous obstacle or of an endangered body causes an unbalance of the receiver system, actuating an alarm or automatically stopping motion toward the obstacle of the protected machine.

19 Claims, 5 Drawing Figures

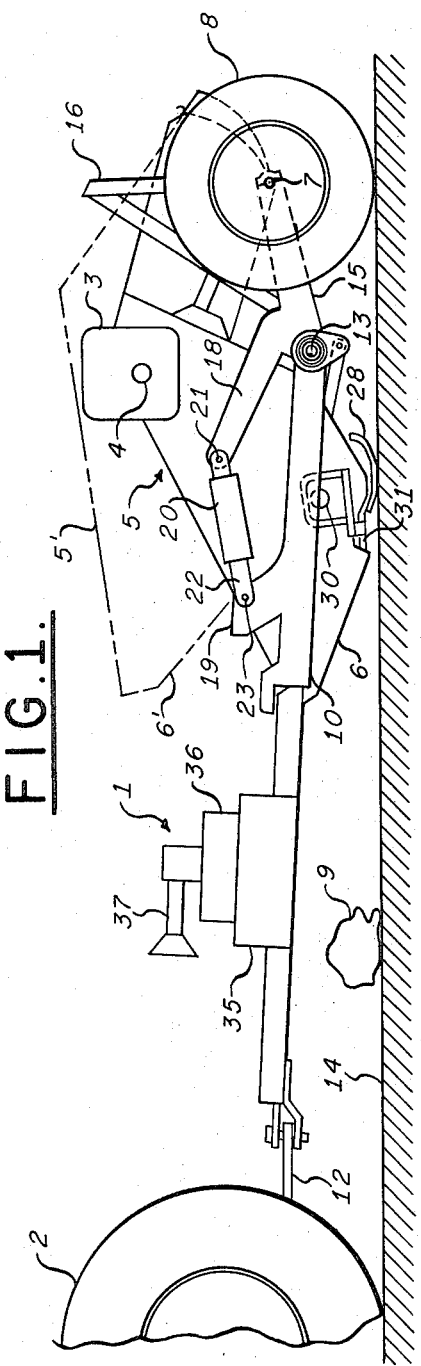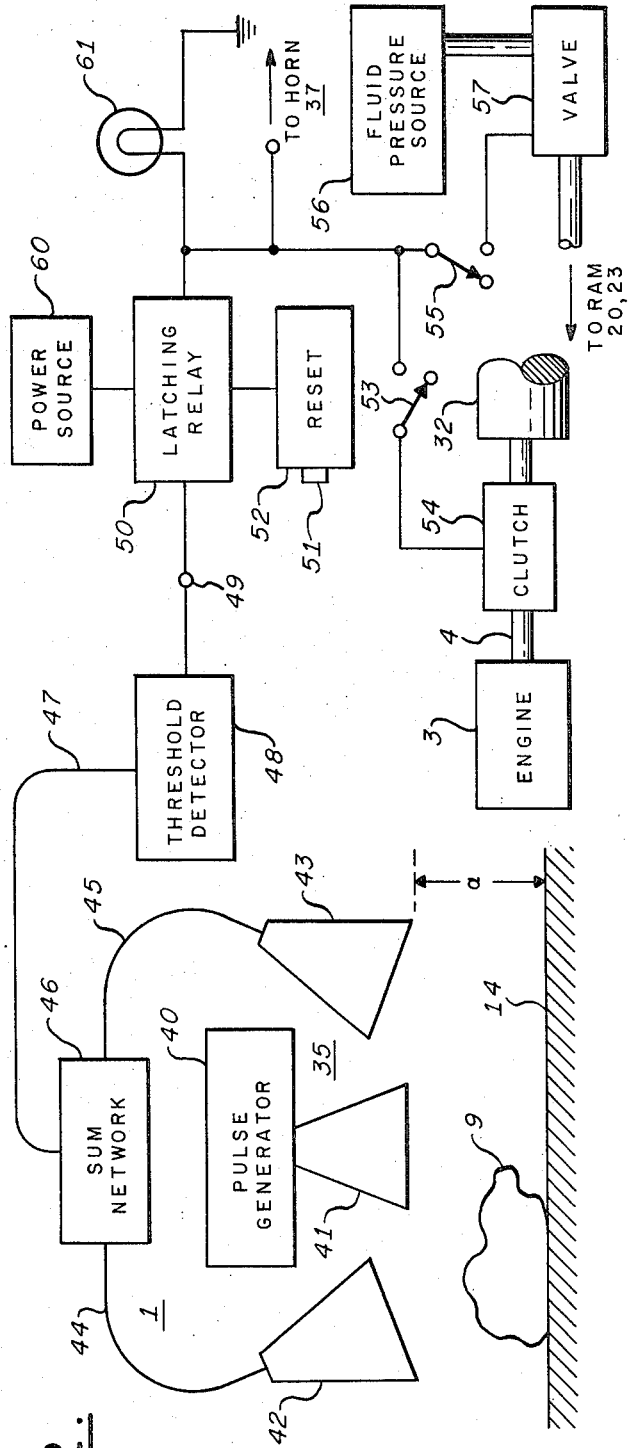

INVENTOR
GERALD F. ROSS
BY

ATTORNEY

VEHICLE PROTECTIVE SYSTEM

BACKGROUND OF THE INVENTION

1. Field of the Invention

The invention pertains to apparatus for the protection of machines including those designed to process a material, crop, or product, from physical impact with or injection of foreign objects prone to damage the machines or to be damaged by the machines and more particularly relates to balanced, pulse transmission and reception means adapted to produce an unbalance or protective control signal in the presence of such a foreign body.

2. Description of the Prior Art

In material handling such as, for instance, in hay harvesting operations, it is customary to condition the cropped material for drying after it is moved and before it is formed into windrows. The conditioning operation may be performed by a towed machine in which the cropped material is passed between a pair of rollers which crack the stems to facilitate the desired escape of moisture and shorten the crop drying time. The conditioning machine is commonly towed behind a tractor and may include a crop mower.

One of the pair of rollers is journalled in a fixed location on a frame of the crop conditioning machine. The second roller is conventionally flexibly mounted to permit its movement away from and back toward the first roller. In the event that unusually large wads of crop material are carried between the rollers, they separate momentarily to allow the wad to pass through while still being conditioned. In the event a large foreign obstacle is picked up with the crop, it may similarly pass through the rollers though, depending upon the size of the object, the rollers or their suspension system may be subjected to strain or to the possibility of actual damage. In general, conventional roller biasing arrangements are complex, rather expensive, and usually difficult to adjust according to different crop conditions. The arrangements do not generally lend fully efficient operation if adjusted for accommodating large foreign objects.

Such types of crop conditioners may also employ a sub-frame flexibly suspended on the main frame of the machine to enable the sub-frame when in its lowered or operating position to float on skid shoes with respect to the ground surface so as to follow a changing ground contour. When the frontal portion of the sub-frame elements hits a large relatively fixed object such as a tree stump or stone, the inertia of the total suspended system is overcome and the sub-frame is momentarily tilted upward to relieve the frontal elements of the impact forces. The suspension system may also be arranged to permit the sub-frame to be tilted into a raised transport position when the machine is moved from one crop processing location to another. Such protective arrangements are relatively complex and often expensive and require adjustment according to expected field conditions. Where an unexpectedly large object is impacted, suspension and other elements of the machine may be subjected to severe strain or to actual damage at the critical harvest time.

SUMMARY OF THE INVENTION

The present invention relates to balanced circuit base-band pulse radiation obstacle detector systems for the protection of vehicles and other machinery from harsh contact with dangerous foreign bodies or obstacles, such as rocks or tramp metal which may lie hidden in the environment in which the vehicle or machine is used. The detection system employs a symmetric balanced network radiation and detection system feeding a threshold detector device which responds to the presence of a dangerous or endangered obstacle by producing an unbalance signal for actuating an alarm or protective control device. Further, the invention relates to apparatus for the protection of an operator from injurious contact with a farm or other machine.

BRIEF DESCRIPTION OF THE DRAWINGS

FIG. 1 is an elevation view showing the novel protective device in a working location on a typical crop harvesting machine.

FIG. 2 is a schematic block diagram of the protective device shown in FIG. 1.

DESCRIPTION OF THE PREFERRED EMBODIMENT

Figure 3:
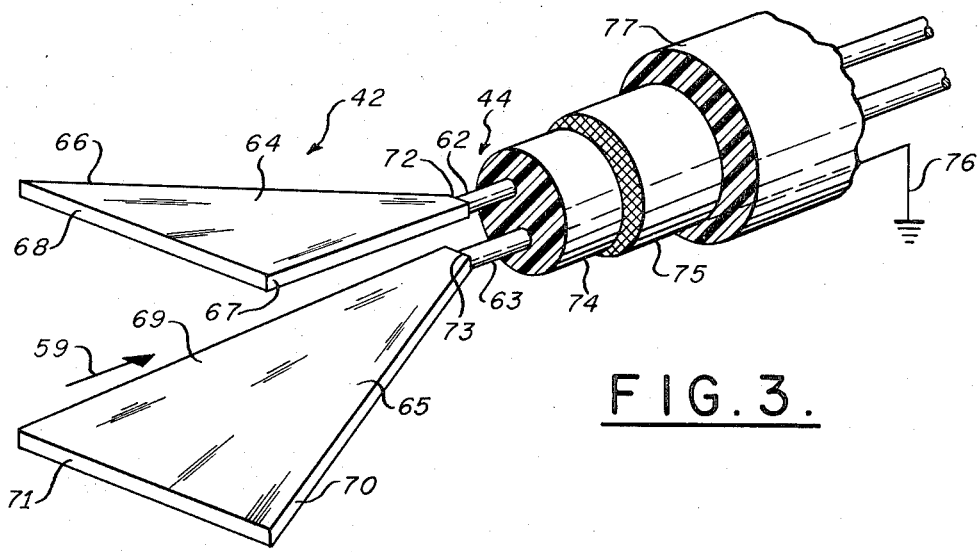
FIG. 3 is a perspective view, partly in cross section, of a receiver antenna-transmission line element employed in the circuit of FIG. 2.

Referring to FIG. 1, the novel object detector 1 is shown mounted on the drawbar 11 of a typical farm crop processing machine of the type towed by a tractor 2 as described in detail in the Lausch et al. U.S. Pat. No. 3,517,491 for a "Header Suspension Mounting for Pull-Type Harvesters", issued June 30, 1970 and assigned to the Sperry Rand Corporation. The invention may be advantageously used with other types of farm tools, such as with the apparatus of the McCarty et al. U.S. Pat. No. 3,375,643 for a "Harvesting Device", issued April 2, 1968 or of the Halls et al. U.S. Pat. No. 3,520,118 for an "Interchangeable Header for Use with Trail-Type and Self-Propelled Agricultural Harvesting Machines", issued July 14, 1970, both patents being assigned to the Sperry Rand Corporation. It will be understood by those skilled in the art that the invention has utility in sundry applications apart from farm tools wherever the presence of a dangerous obstacle or an endangered body in the path of a vehicle must be detected, or for the detection of out-size objects on a conveyor belt, and the like.

The novel object detector 1, to be discussed in further detail in connection with FIGS. 2 to 4, consists of a multiple antenna system 35 for illuminating a region above the ground surface 14 below drawbar 11 to be passed over by the towed vehicle and particularly for illuminating any dangerous object, such as a metal part, rock 9, or other body lying in the path of the vehicle. The object detector 1 further comprises a transceiver 36 mounted in cooperative relation with antenna system 35 and a device controlled by the output of transceiver 36, such as an alarm horn 37 or other alarm or emergency control device, as will be further explained. Electromagnetic, sonic, or other radiations may be used.

The harvester apparatus of FIG. 1 is, for example, adapted to be towed by a tractor 2 when drawbars 11 and 12 are coupled and has a main frame 10 including a transverse rockshaft 13 pivoting within sleeve bearings in frame 10. A pair of laterally spaced wheel arms 15, on each of which is journaled at pivot 7 a wheel 8, extend rearwardly; each wheel arm 15 is pivotally mounted on rockshaft 13. Wheel arms 15 and associated header frame 16 support the suspended header 5, which is attached to frame 16 so that when the position of wheel arms 15 is adjusted by rocking about the shaft 13, frame 15 pivots upward about the pivot 7 of the supporting wheels 8, carrying the associated header frame 16 and raising the upper elements of header 5 to the position indicated by dotted line 5'.

The means for lifting header 5 includes a ram consisting of a cylinder 20 and a piston 22, a heavy duty bell crank arm 18 having one end welded to rockshaft 13, and a bracket 19 welded to the forward part of main frame 10. The ram elements 20 and 22 are interposed between bell crank arm 18 and bracket 19, cylinder 20 being pivoted at pin 21 and piston 22 at pin 23.

The header 5 may be equipped with a crop reeling device and, as shown in FIG. 1, with a sickle mower assembly 30 having a reciprocable mowing sickle 31 which may be driven from tractor 2 or by an internal combustion engine 3 mounted on header 5 and having a drive shaft 4 for driving crop conditioning rollers within the header, such as roller 32 of FIG. 2. Engine 3 is adapted in a conventional manner also to drive mower assembly 30.

When in the operating position shown in the solid lines of FIG. 1, adjustably mounted skid shoes 28 permit the header 5 to operate so that the sickle 31 is at an advantageous level above ground 14 for mowing the crop. The general construction permits header 5 substantially to follow the contour of ground 14.

In conventional practice, the tractor operator may raise the header 5 and thus raise mower assembly 30 by operating a valve to supply fluid under pressure through a flexible hydraulic line (not shown) to cylinder 20, thus forcing the ram 20, 22 to extend and rotating header 5 from its operating position to the position represented by dotted line 5'. In FIG. 1, the horn 37 is intended to alert the tractor operator to the presence of a dangerous object 9 which might damage frontal elements 6 of header 5 or mower assembly 30 or damage the crop conditioning rollers if object 9 is injected into the machine.

The object detector 1 illustrated in FIG. 1 is shown in further detail in FIG. 2 as comprising a self-synchronous pulse generator which may generate a substantially constant pulse-repetition-frequency train of short base-band pulses directed generally downward toward the ground 14. Transmitter antenna 41 may be a conventional pyramidal electromagnetic horn for directing short duration, high frequency or microwave pulses toward the ground and will have a directivity such as to illuminate the region over which a towed vehicle to be protected is to pass. Its directivity is sufficient so as not to supply substantial energy directly into receiver antennas 42 and 43. The distance $a$ between antenna assembly 35 and ground may therefore be several feet.

The pulse generator 40 may be a conventional microwave oscillator, such as a reflex klystron, operated in a conventional manner by a conventional pulsing circuit. On the other hand, if the advantages of subnanosecond or base-band pulses are to be employed, the transmitter may take the form of a delay line pulse generator of the kind well understood in the art to be capable of adjustment such that very short electromagnetic pulses may be radiated. One such device for producing short base-band pulses is disclosed by G.F. Ross in the U.S. Pat. No. 3,402,370 for a "Pulse Generator", issued November 30, 1965, and assigned to the Sperry Rand Corporation. Further, suitable base-band transmitters of an integrated type are described by G.F. Ross and D. Lamensdorf in the U.S. Pat. application Ser. No. 46,079, for a "Balanced Radiation System", filed June 15, 1970 and issued as Pat. 3,659,203 April 25, 1972. The Ross, Lamensdorf device, for instance, employs an electrically smooth, constant impedance, transmission line system for propagating TEM mode electromagnetic waves. The transmission line system is employed for the cooperative cyclic storage of energy on the transmission line and for its cyclic release by propagation along the transmission line for radiation at the end of a section of the transmission line formed as a flared or tapered directive antenna. Thus, cooperative use is made of the transmission line system for signal generation by cyclically charging the transmission line at a first rate of charging and also for signal radiation into space by discharge of the line in a time much shorter than required for charging. Discharge of the transmission line causes a voltage wave to travel toward the open end or radiating aperture of the antenna structure. The process operates to produce, by differentiation, a sharp impulse of subnanosecond duration that is radiated into space. The antenna system has a wide instantaneous band width, so that it may radiate very sharp impulse-like signals with low distortion. Further, the antenna has a desirable energy focusing characteristic. Suitable transmitter systems also appear in the G.F. Ross et al. patent application Ser. No. 123,533 for a "Short Base-Band Pulse Communication System", filed March 12, 1971, and elsewhere.

The object detector antenna assembly 35 also includes a pair of pulse receiver antennas 42 and 43, one each symmetrically located on each side of transmitter antenna 41 and directed downwardly toward ground 14 or other surface upon which a foreign object may appear, at the area generally illuminated by transmitter antenna 41. Depending upon their directivity characteristics, bi-conductor antennas 42 and 43 may be tilted inwardly at their respective apertures toward the axis of transmitter antenna 41. Antenna 42 is understood to be on the tractor side of transmitter 41, while antenna 43 is on the towed vehicle side thereof.

Bi-conductor antennas 42 and 43 are respectively coupled to summation network 46 by respective two-wire transmission lines 44 and 45; any output of summation network 46 appears on two-wire transmission line 47. Transmission line 45 is twisted by 180 angular degrees with respect to line 44 for purposes now to be explained. When a pulse from transmitter antenna 41 illuminates ground 14, no radiation-pattern-disturbing object 9 being present, and receiver antennas 42 and 43 being properly balanced, equal signals reflected by ground 14 are received by antennas 42 and 43. By virtue of the twist in transmission line 45, equal but opposite signals are simultaneously injected into summation network 46. Therefore, there is no output from network 46 on transmission line 47 in the absence of object or obstacle 9. In the presence of obstacle 9, in the position illustrated in FIGS. 1 and 2, an unbalanced condition results, with antenna 42 receiving a signal of different amplitude than that received by antenna 43. Consequently, the signals input to summation network 46 no longer cancel, and the output on transmission line 47 is finite, as will be described.

Any output signal on transmission line 47 is coupled to threshold detector 48, whose output is connected through terminal 49 to a control device, such as a latching relay 50 which may be reset by manual or other operation of reset button 51 of reset circuit 52. Any signal output from summation network 46 capable of exceeding the threshold voltage of threshold circuit 48 causes relay 50 to operate and to latch, supplying a continuing control voltage from source 60 to an alarm such as horn 37 or to a red danger light 61 mounted on tractor 2 where it is readily visible to the tractor operator. Such alarm operation signals the presence of the dangerous object 9 in the path of the harvesting machine, indicating that the tractor operator should stop the forward motion of the vehicles for the obstacle to be removed. It will be understood that power source 60 may be used to supply energy to other parts of the invention, such as generator 40, detector 48, and the like.

The output of latching relay 50 may be used to cause a positive actuation ensuring protection of the harvester or other machine, such as by shorting the ignition system of tractor 2 in a conventional manner, halting its forward motion. On the other hand, as seen in FIG. 2, the alarm signal may be used, when switch 53 is closed, to operate magnetic clutch 54, thus declutching engine 3 from crop conditioning roller 32. With switch 55 closed, the alarm signal may be caused to supply fluid under pressure from a tractor pressure reservoir 56 through electromagnetically actuatable valve 57 to operate the ram 20, 22 of FIG. 1, thus raising the lower parts of header 5 well above obstacle 9 while the harvester machine passes unharmed over it. Automatic or manual operation of the reset device 52 may permit power from source 60 to be cut off, returning the alarm or control devices to their normal quiescent states. For example, alarm horn 37 stops sounding, header 5 is returned to its normal operating position with skid shoes 28 contacting ground 14, or engine 3 again drives roller 32 as soon as reset circuit 52 is actuated.

Figure 4:
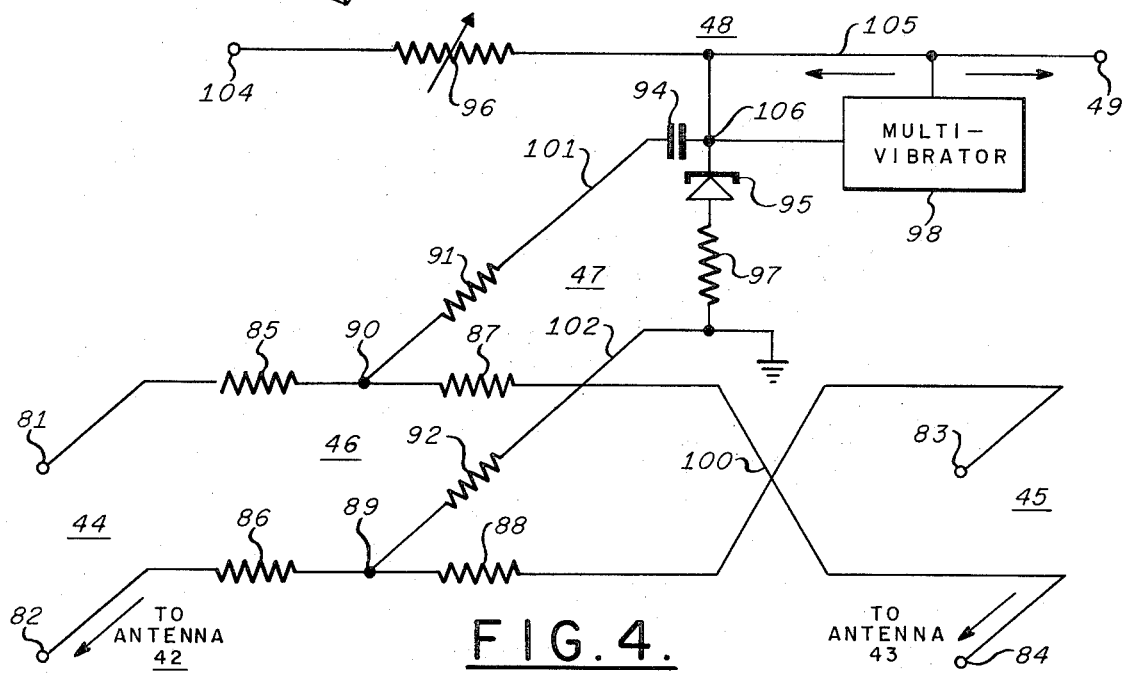
FIG. 4 is a circuit diagram showing details of the summation network and threshold detector circuit of FIG. 2.

FIG. 3 illustrates details of a bi-conductor antenna suitable for use in the invention for receiver antennas 42 and 43. Antenna 41 may also be similar in principle, as seen in the aforementioned Pat. application Ser. No. 46,079. In FIG. 3, the receiver antenna 42, for instance, comprises a structure having mirror symmetry about a median plane at right angles to the vector of the electric field propagating into the antenna in the direction indicated by arrow 59. The same is true of the cooperating transmission line 44 which comprises parallel wire transmission line conductors 62 and 63; conductors 62 and 63 are spaced wires constructed of a material capable of conducting high frequency currents with substantially no ohmic loss. Further, conductors 62 and 63 are preferably so constructed and so arranged as to support TEM mode propagation of high frequency energy, with the major portion of the electric field lying between conductors 62 and 63.

The bi-conductor TEM receiver antenna 42 further consists of a pair of flared, flat, electrically conducting planar members 64 and 65. Members 64 and 65 are, for example, generally triangular in shape, member 64 being bounded by flared edges 66 and 67 and a frontal aperture edge 68. Similarly, member 65 is bounded by flaring edges 69 and 70 and a frontal apertured edge 71. Frontal aperture edges 68 and 71 may be straight or arcuate. Each of triangular members 64 and 65 is slightly truncated at its apex, the truncations 72 and 73 being so constructed and arranged that conductor 62 is smoothly joined without overlap at 72 to antenna member 64. Likewise, conductor 63 is smoothly joined without overlap at truncation 73 to antenna member 65. It is to be understood that the respective junctions at truncations 72 and 73 are formed using conventional techniques for minimizing any impedance discontinuity corresponding to the junctions.

It is also to be understood that the flared members 64 and 65 of antenna 42 are constructed of material highly conductive for high frequency currents. It is further apparent that the interior volume of antenna 42 may be filled with an air foamed dielectric material exhibiting low loss in the presence of high frequency fields, such material acting to support planar conductor 64 in fixed relation to planar conductor 65. Alternatively, the conductive elements of antenna 42 may be fixed in space relation by dielectric spacers which cooperate in forming enclosing walls for the configuration, protecting the interior conducting surfaces of antenna 42 from the effects of dust and corrosion.

As noted, the planar collector elements 64 and 65 of receiver antenna 42 are coupled in impedance matched relation to the two wire transmission line 44. Transmission line 44 is arranged to have the same impedance as the transmission line comprising antenna elements 64 and 65. Transmission line 44 may have its parallel wire conductors 62 and 63 molded into a dielectric element 74 for the purpose of accurately determining the separation of conductors 62, 63 and so that line 44 has a constant impedance along its length. Dielectric element 74 may be surrounded by a braided or other conductive shield 75 which may be grounded at a convenient location, as by lead 76. Shield 75 may, in turn, be surrounded by a protective plastic cover element 77 of the well known type. The conductors of the balanced two wire line 44 are thus readily attached to the input to summation device 46. Receiver antenna 43 and two-wire line 45 are similarly constructed, except for the aforementioned 180 angular degree twist in transmission line 45, as will be seen from the discussion to follow of FIG. 4.

The cooperating antennas 42 and 43 and respective transmission lines 44 and 45 of the form shown in FIG. 3 are preferred in part, because TEM mode propagation therein is readily established. The TEM propagation mode is preferred in the transmitter and receiver antennas, since it is the substantially non-dispersive propagation mode and its use minimizes distortion of the reflected subnanosecond signal to be received. The simple, balanced transmission line structure permits construction of the antenna-transmission line configuration with minimum impedance discontinuities. By maintaining a continuously constant characteristic impedance and TEM propagation along the structure including antenna 42 and line 44, for example, frequency sensitive reflections are prevented therein and frequency dispersion is eliminated. The received subnanosecond impulses therefore flow through antenna 42 and line 44 and through antenna 43 and line 45 without substantial reflection and without substantial degradation in shape or amplitude. Since the full energy or amplitude of a low-level subnanosecond base-band pulse is thus delivered by the dual receiver antenna-transmission line system, it is seen that the threshold device 48 of FIG. 2 can be sensitive to extremely short-duration low-level base-band pulses having an extremely wide spectral content which would be incapable of detection using conventional wide pulse reception techniques. It will be further understood by those skilled in the art that the invention is not limited to use with the particular antennas illustrated in the drawings, since the system may be used with other antennas.

A circuit representing transmission lines 44 and 45, summation network 46, and threshold device 48 of FIG. 2 will now be discussed in connection with FIG. 4. Terminals 81, 82 of two-wire transmission line 44 couple to antenna 42 and supply input signals to resistors 85, 86. If line 44 is arranged to be a 150 ohm line, resistors 85 and 86 may each be 25 ohm resistors.

Figure 5:
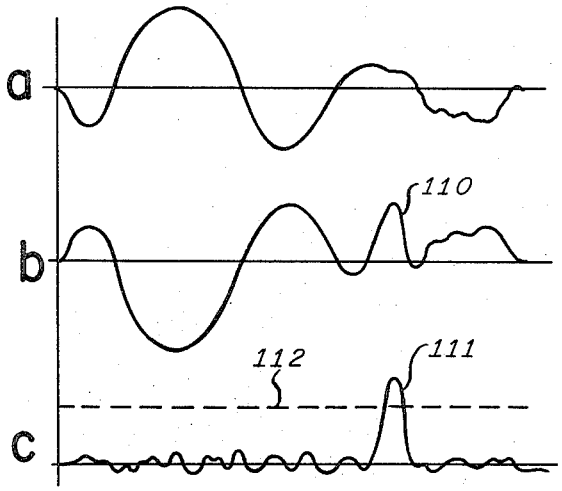
FIG. 5 illustrates wave forms useful in explaining the operation of the invention.

Similarly, terminals 83, 84 of two wire transmission line 45 couple to antenna 43 and supply signals to resistors 87, 88. With line 45 selected to be a 150 ohm line, resistors 87 and 88 will again each be 25 ohm resistors. The desired 180 angular degree reversal in transmission line 45 is indicated by cross-over 100. The common junction 90 of resistors 85 and 87 is coupled to output 25 ohm resistor 91, while the common junction 89 between resistors 86 and 88 is coupled to output 25 ohm resistor 92. Resistors 91 and 92 feed the two respective conductors 101, 102 of the dual-wire transmission line 47. It is seen that summation circuit 46 comprising resistors 85, 86, 87, 88, 91 and 92 performs its normal function of adding the signal input at terminals 81, 82, such as signal A of FIG. 5, to the input on terminals 83, 84, such as signal B of FIG. 5, after polarity reversal by cross-over 100. Any unbalance signal, such as signal component 110 of wave B of FIG. 5, appears on conductors 101, 102 of output transmission line 47 in the form of the pulse 111 of wave C of FIG. 5 for supply to threshold detector 48.

Any subnanosecond or other unbalance pulse 111 formed by summation circuit 46 is passed with substantially no degradation within two wire transmission line 47 to the active threshold element 95 of threshold detector 48, which element is preferably a tunnel diode or other high speed diode adapted to serve as an impulse detector. A suitable diode 95 has a negative resistance current-voltage characteristic such that, under proper bias, the diode response to the arrival of an impulse on line 47 is to move abruptly into its region of instability, causing it to become highly conductive if pulse 111 is above the threshold value 112 of FIG. 5. While other such diodes may be used, a suitable diode is the germanium 1N3717 tunnel diode.

Diode 95 is coupled to conductor 101 through a small capacitor 94 and through resistor 97 to ground and also to conductor 102 of transmission line 47. Resistor 97 serves a potential level setting function enabling tunnel diode 95 to drive a multivibrator circuit 98, and aids in providing a proper impedance match to line 47 so that reflections are avoided. Capacitor 94 acts as a coupling capacitor, preventing damage to the threshold circuit 48 if the input is accidentally shorted. An appropriate bias source (not shown) for diode 95 is connected to terminal 104 for providing bias current flow through adjustable resistor 96, level setting resistor 97, and diode 95.

In this manner, a current impulse of somewhat greater amplitude but of considerably longer duration is generated by tunnel diode 95 and is coupled to the input of one shot multivibrator circuit 98; the longer duration, higher energy signal is required for reliable triggering of a stable multivibrator 98. The output pulse of multivibrator 98 may be a rectangular pulse of 100 nanosecond duration, for example, which is passed by terminal 49 to operate latching relay 50 of FIG. 2. The 100 nanosecond pulse is also coupled by lead 105 to the junction 106 between bias control resistor 96 and diode 95. At junction 106, the trailing edge of the 100 nanosecond pulse has the effect of resetting diode 95 and of stopping conduction therethrough. Thus, tunnel diode 95 is reset to its original low conduction state and is prepared to receive the next arriving impulse from transmitter-antenna configuration 35 which exceeds the triggering level of diode 95. By way of example, if transmitter pulse generator 40 produces impulses at a repetition frequency in the vicinity of 5 kilohertz, the output of multivibrator 98 is a pulse train of 100 nanosecond pulses having a repetition frequency of 5 kilohertz. Any one of the train of impulses may cause relay 50 to latch and to remain latched until the unbalance signal in transmission line 47 is removed by removal of the obstacle causing its generation, or by actuation of reset circuit 52. It will be understood by those skilled in the art that the receiver may be similar to that disclosed in the K.W. Robbins U.S. Pat. application Ser. No. 123,720 for a "Short Base-Band Pulse Receiver," filed March 12, 1971, and issued as Pat. 3,662,316 May 9, 1972 and assigned to the Sperry Rand Corporation.

It is seen that the invention is a pulse or base-band impulse radio system for the protection of harvest or other machinery or the like from damage due to obstacles often hidden in a crop to be processed. Unlike prior detection systems which sense a magnetic field or a magnetic field gradient, the invention protects farm and other tools against non-magnetizable objects, as well as against objects comprised of a magnetizable metal. The transmitter 40, 41 is particularly adapted, in a preferred form, for using low-total-energy-level transmitted impulses having a spectral content spread over a very wide band so as to make no significant contribution to the background electrical noise level and thus operating well below levels interfering with government controlled radio transmissions. The transmitter of the novel system is adapted to excite a cooperating base-band threshold circuit 48 of such a unique nature that the latter is substantially unaffected by ambient noise or ordinary pulse transmissions, such as ignition noise from internal combustion engines. Since the transmitter may operate from very low energy consumption, power supply cost and size is minimized. Furthermore, with such low power operation, inexpensive components may find long life use throughout the transmitter. The receiver or threshold circuit 48 is similarly categorized, both the receiver and transmitter elements being of very simple nature and otherwise inexpensive to install, maintain, and operate, adapting readily to cooperative use with conventional farm tool and other control equipment for their protection or for the protection of the operators thereof. The object detector may readily be mounted in a variety of locations and heights above ground on various machines or vehicles. Further easing mounting requirements is the balanced nature of the system which permits detector 1 to be reversed in position; i.e. antenna 43 may be the forward antenna and antenna 42 the rearward one.

While the invention has been described in its preferred embodiment, it is to be understood that the words which have been used are words of description rather than of limitation and that changes within the purview of the appended claims may be made without departing from the true scope and spirit of the invention in its broader aspects.

I claim:

1. Protective apparatus for use in combination with a vehicle having a crop harvester thereon susceptible to damage by a foreign body comprising:
   radio signal transmitter means for location on said vehicle,
   first and second radio signal reception means placed substantially symmetrically with resepct to said signal transmitter means,
   subtractive network means responsive to said signal reception means adapted to yield substantially no output in the absence of said foreign body,
   threshold means responsive to the output of said subtractive network means in the presence of said foreign body, and
   actuating means responsive to said threshold means in the presence of said foreign body and prior to contact of said crop harvester with said foreign body.

2. Apparatus as described in claim 1 wherein said radio signal transmitter means comprises means for illuminating said region with a train of energy impulses.

3. Apparatus as described in claim 2 wherein said radio signal transmitter means comprises means for generating subnanosecond duration base-band pulses of electromagnetic energy.

4. Apparatus as described in claim 1 wherein said radio signal reception means comprises substantially non-dispersive wideband transmission line means for collecting and propagating electromagnetic energy in the TEM transmission line mode.

5. Apparatus as described in claim 1 wherein said subtractive network means comprises means responsive to said first radio signal reception means for inverting the output thereof.

6. Apparatus as described in claim 5 wherein said subtractive network means comprises:
   first input means responsive to said inverted output of said first radio signal reception means,
   second input means responsive to said second radio signal reception means, and
   output means coupled substantially symmetrically between said first and second input means.

7. Apparatus as described in claim 6 wherein said output means comprises non-dispersive broad band transmission line means.

8. Apparatus as described in claim 1 wherein said threshold means comprises semiconductor diode means having first and second states in energy exchanging relation with said subtractive network means.

9. Apparatus as described in claim 8 wherein said subtractive network means is adapted to couple an electromagnetic energy pulse across said semiconductor diode means for causing said diode to transfer from its said first to its said second state.

10. Apparatus as described in claim 9 wherein said threshold means comprises:
    first circuit means for biasing said semiconductor diode means in said first state for permitting said semiconductor diode means to transfer from its said first to its said second state instantaneously upon arrival at said semiconductor diode means of said electromagnetic energy pulse,
    second circuit means coupled to said first circuit means for producing an output wave of greater duration than the duration of said electromagnetic energy pulse, and
    third circuit means utilizing a version of said output wave for returning said semiconductor means to its said first state.

11. Apparatus as described in claim 1 wherein said actuating means responsive to said threshold means comprises:
    materials processing means,
    engine means in operative driving relation with said materials processing means, and
    means for interrupting said driving relation in response to an output from said threshold means.

12. Apparatus as described in claim 1 wherein said actuating means responsive to said threshold means comprises:
    materials processing means, and
    actuator means responsive to an output from said threshold means for moving said materials processing means from the relative path of said foreign body.

13. Apparatus as described in claim 1 wherein said actuating means responsive to said threshold means comprises alarm means for alerting of the presence of said foreign body.

14. Apparatus as described in claim 1 wherein:
    said signal transmitter means comprises means for generating a train of subnanosecond duration base-band electromagnetic pulses,
    said signal reception means comprises substantially non-dispersive broad band transmission line means for collecting and propagating said subnanosecond pulses in the TEM transmission line mode reflected from said surface,
    said network means comprises balanced resistive tee network means for receiving direct and inverted subnanosecond pulses from said signal reception means, and
    said threshold means comprises: tunnel diode means having first and second states biased in said first state and responsive to said network means by changing to its said second state, and
    circuit means responsive to said tunnel diode means when in said second state for producing an output wave of greater duration than the duration of said subnanosecond pulse.

15. Protective apparatus for use in combination with a vehicle having a crop harvester thereon susceptible to damage by a foreign body comprising:
    non-contacting sensor means for location on said vehicle for operation with respect to the input path of material to be processed by said apparatus for providing an output signaling the presence of said foreign body in said input path,
    actuator means rendered operative in the presence of said output signaling the presence of said foreign body in said input path prior to contact of said crop harvester with said foreign body, and actuatable means responsive to said actuator means for protecting said part of said crop harvester from damage by said foreign body.

16. Apparatus of the character described in claim 15 wherein said actuatable means comprises means for lifting the input of said material handling apparatus so that said foreign body passes thereunder.

17. Apparatus of the character described in claim 15 wherein said actuatable means comprises alarm means.

18. Protective apparatus for use in combination with a vehicle having a crop harvester including material processing means susceptible to damage by a foreign body when injected therein comprising:

non-contacting sensor means for location on said vehicle for operation with respect to the input path of material to be processed by said apparatus for providing an output signaling the presence of said foreign body in said input path, motive means for driving said material through said material processing means, actuator means rendered operative in the presence of said output signaling the presence of said foreign body in said input path, actuatable means responsive to said actuator means for protecting said material processing means from damage by said foreign body, said actuatable means being responsive to said actuator means for rendering said motive means ineffective in the presence of said foreign body before injection into said crop harvester.

19. Apparatus of the character described in claim 18 in which said actuatable means includes clutch means for disconnecting said motive means for stopping flow of said material in the presence of said foreign body.

* * * * *